June 10, 1941.  A. B. COLE  2,245,465
PORTABLE CABIN
Filed Oct. 31, 1938  4 Sheets-Sheet 1
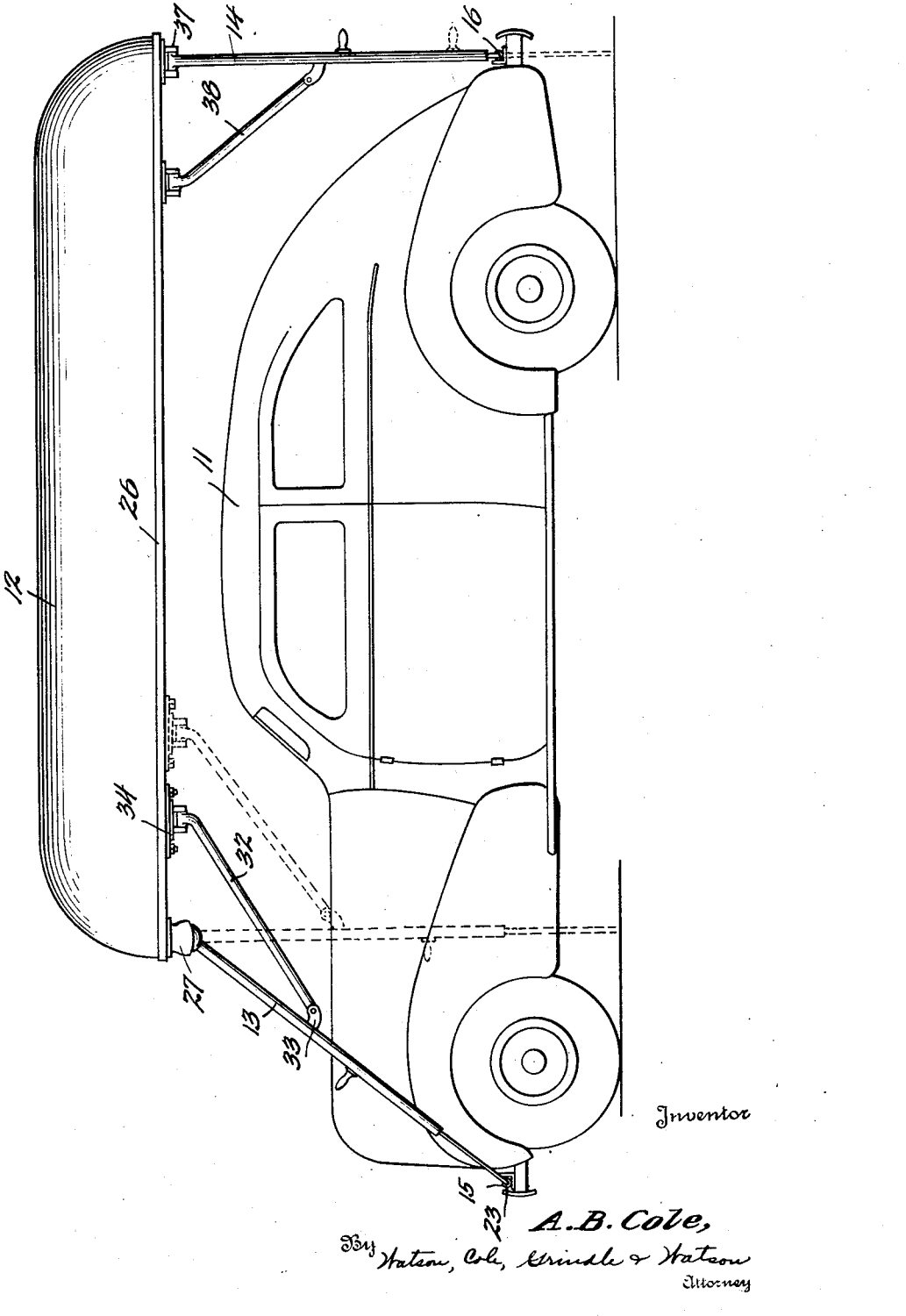

June 10, 1941.  A. B. COLE  2,245,465
PORTABLE CABIN
Filed Oct. 31, 1938  4 Sheets-Sheet 2
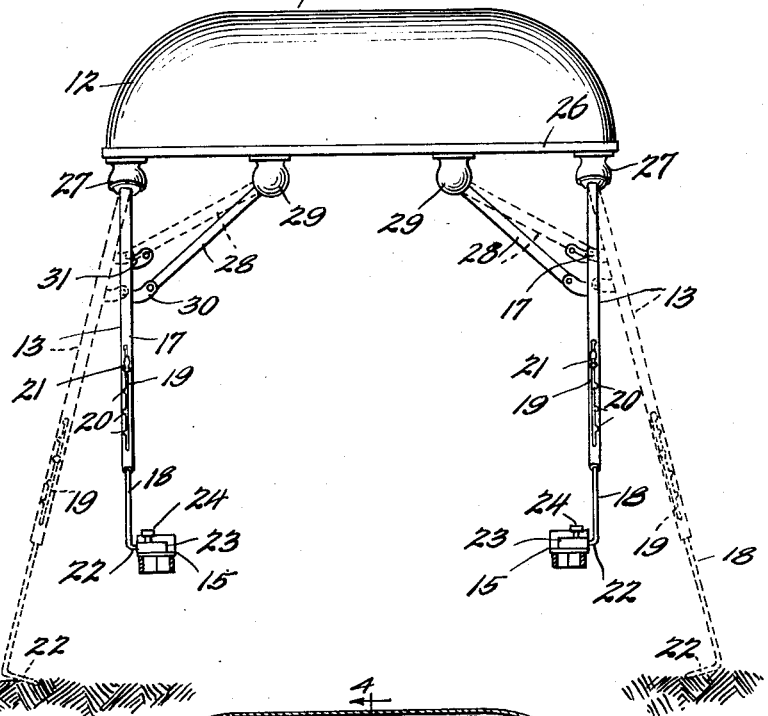
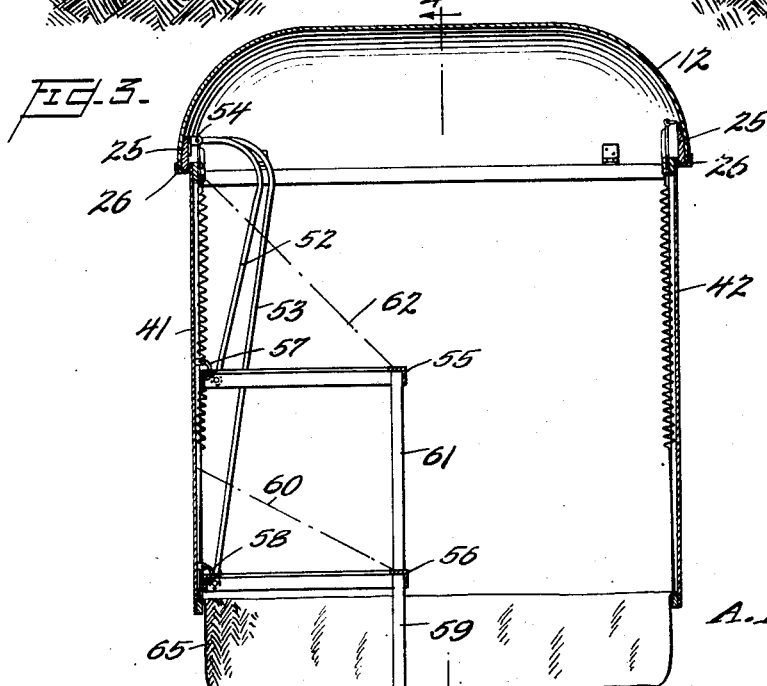

June 10, 1941.    A. B. COLE    2,245,465
PORTABLE CABIN
Filed Oct. 31, 1938    4 Sheets-Sheet 3
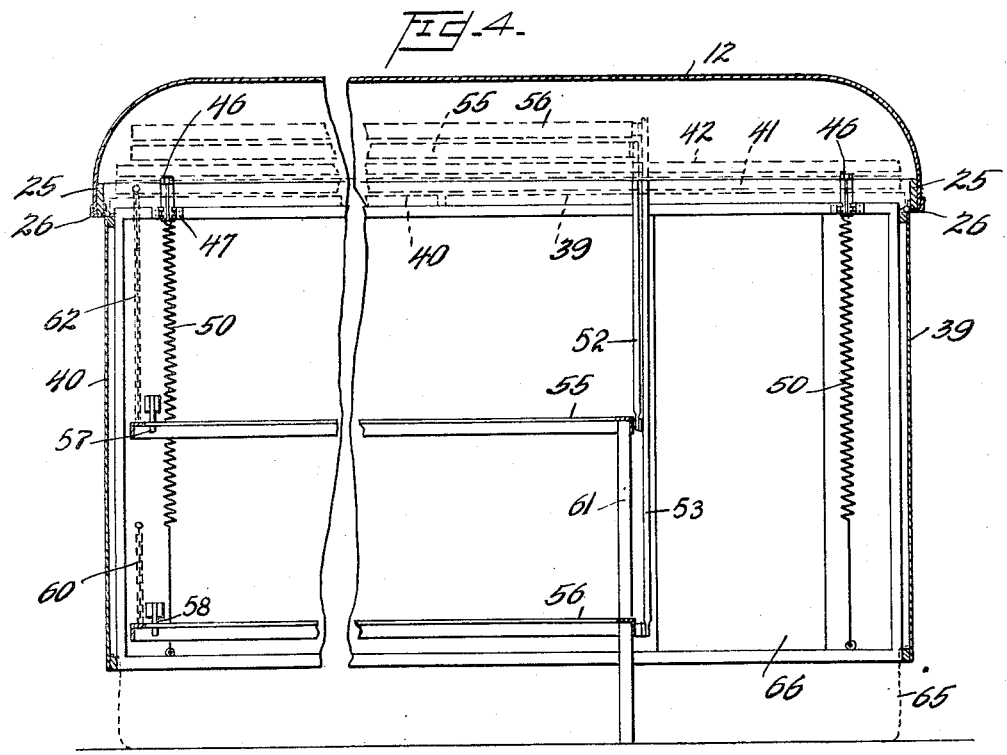
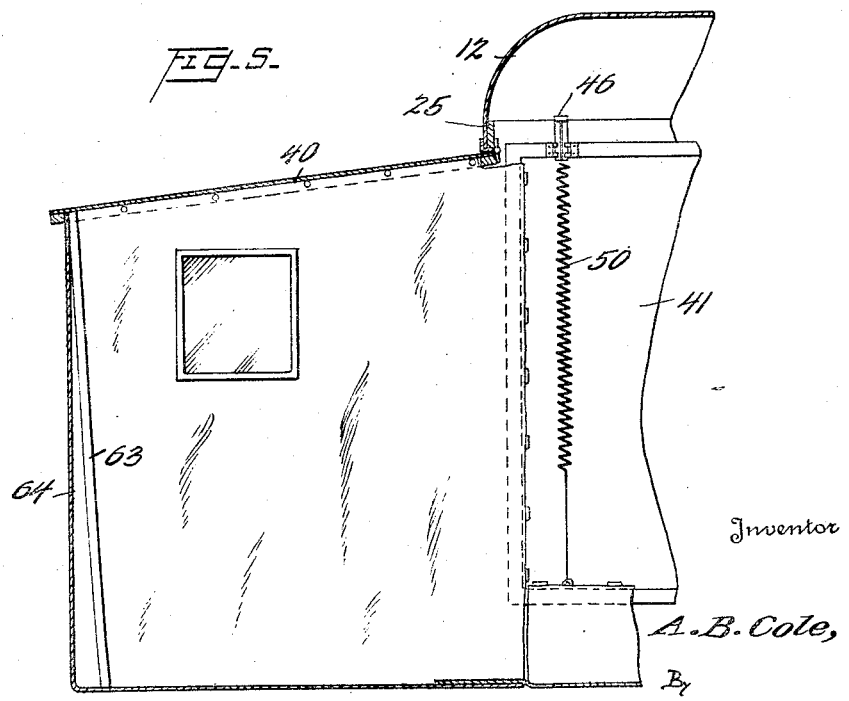
Inventor
A. B. Cole,
By
Watson, Cole, Grindle & Watson, Attorneys June 10, 1941.　　　A. B. COLE　　　2,245,465
PORTABLE CABIN
Filed Oct. 31, 1938　　　4 Sheets-Sheet 4
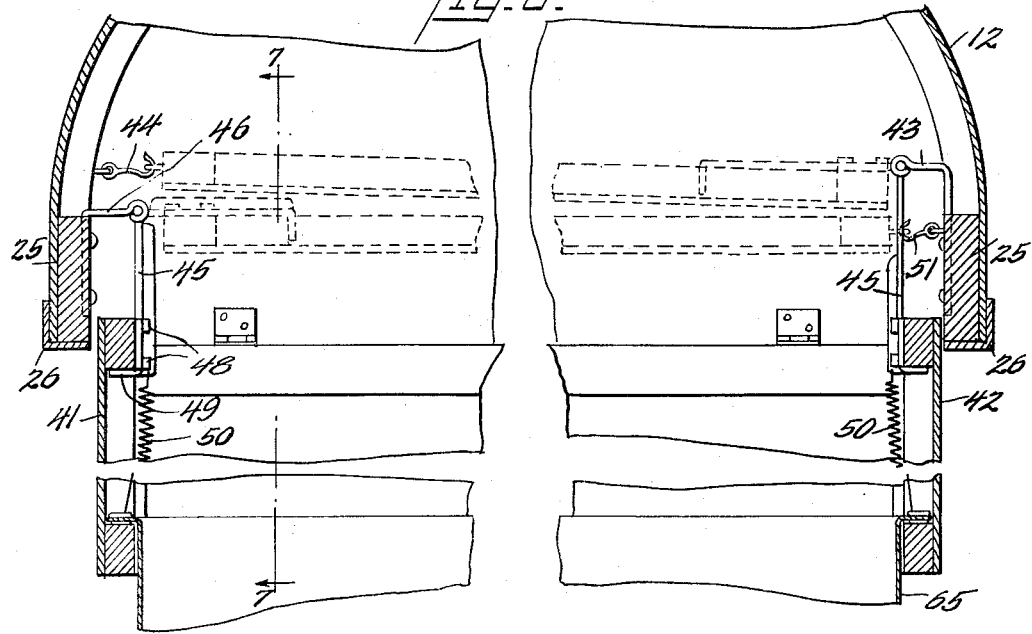
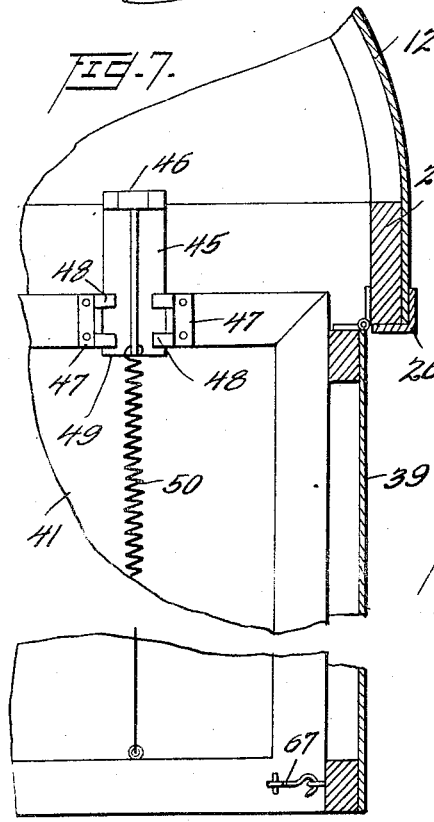
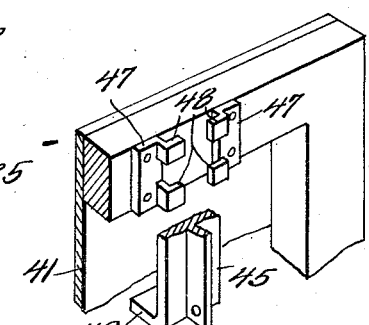
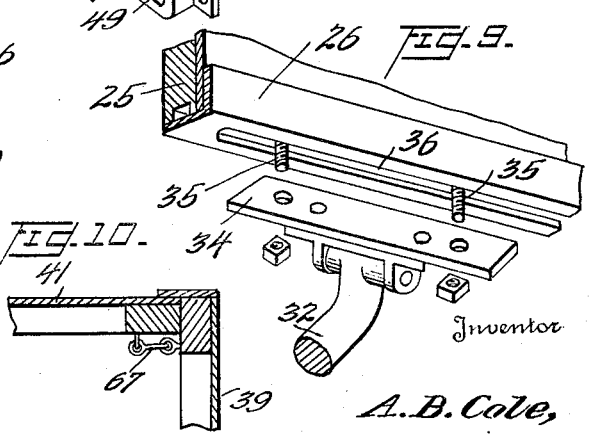
Inventor
A. B. Cole,
By Watson, Cole, Grindle & Watson
Attorneys Patented June 10, 1941

2,245,465

UNITED STATES PATENT OFFICE 2,245,465

PORTABLE CABIN

Albert B. Cole, Rockingham, N. C.

Application October 31, 1938, Serial No. 238,042

13 Claims. (Cl. 20—2)

This invention relates to portable structures, and more particularly to a folding house structure, or cabin, adapted to be transported on a passenger automobile, for use by tourists, campers, and others desiring to make use of portable living quarters. The portable cabin of the present invention may advantageously be substituted for the well known trailer, since it possesses most of the features of a trailer but lacks many of the disadvantages of the latter.

It is a general object of the present invention to provide a portable cabin which may be mounted on a passenger motor vehicle quickly and with a minimum of effort, and which in no way affects the operation of the vehicle or detracts from its roadability.

A further object is the provision of a portable structure of the class described which may be quickly and easily detached from the transporting vehicle and arranged to provide comfortable and weather-tight living quarters.

Another object is the provision of a portable structure which may be attached to a motor vehicle by the simple expedient of folding the side walls of the cabin upwardly into its roof portion, driving the vehicle under the folded cabin, and attaching the vertical supports at the four corners of the cabin to the vehicle.

A further object is the provision of a structure of the class described, the vertical supports and diagonal braces therefor being so constructed and arranged that the structure may be rigidly secured on a motor vehicle in order that it may be transported on said vehicle without affecting the operation or detracting from the roadability of the vehicle.

Other and further objects, features and advantages of the present invention will be apparent to one skilled in the art upon a consideration of the following description taken in connection with the accompanying drawings in which Figure 1 is a side elevation of a passenger motor vehicle carrying a portable cabin constructed in accordance with the present invention;

Figure 2 is an end elevation of a cabin constructed in accordance with the present invention in folded condition, illustrating the means by which it is attached to the vehicle and showing, in broken lines, the position of the legs or vertical supports when the cabin is supported on the ground;

Figure 3 is a transverse sectional view of a cabin constructed in accordance with the present invention;

Figure 4 is a section on line 4—4 of Figure 3;

Figure 5 is a partial longitudinal section of one end of a cabin constructed according to the present invention, showing one of the end walls raised to form an auxiliary roof;

Figure 6 is an enlarged transverse section illustrating the manner in which the side and end walls are supported and showing, in broken lines, the manner in which the side walls are retained in folded position;

Figure 7 is a fragmentary longitudinal section on line 7—7 of Figure 6;

Figure 8 is a detail of the hinge structure of Figures 6 and 7;

Figure 9 is an exploded detail view of the manner of attaching the forward longitudinal braces to the frame of the cabin; and Figure 10 is a fragmentary horizontal section through a corner of a cabin construction in accordance with the present invention.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Figure 1 illustrates the cabin of the present invention, in folded condition, mounted on a motor vehicle 11. The cabin comprises, generally, an arched roof structure 12 supported upon a pair of forward legs 13 and a pair of rear legs 14. The side walls and other parts of the cabin structure are folded up under the roof 12 in a manner hereinafter described.

In the embodiment illustrated, the roof 12 is shown as being somewhat shorter than the overall length of the vehicle 11, but it will be understood that the dimensions of the roof, and thus of the cabin, may be varied at will, so long as the size of the cabin is maintained within limits so as to be conveniently transportable on a motor vehicle.

The legs 13, arranged at the forward end of the cabin are secured in suitable brackets 15 attached to the front bumper of the vehicle, while the legs 14 at the rear end of the cabin are secured in similar brackets 16 attached to the rear bumper. However, it will be appreciated that the brackets 15 and 16 may be attached to any convenient member of the vehicle which is sufficiently rigid for the purpose.

As best seen in Figure 2, each leg 13, 14 comprises a tubular member 17 and a telescoping rod 18. The tubular member 17 is provided with a longitudinal slot 19 having spaced notches 20 formed in one edge thereof. Each rod 18 is provided with a handle 21 threaded therein, and it will be apparent that the position of the rod 18 within the tubular member 17 may be adjusted by loosening the handle 21, moving the rod 18 to the desired position, and tightening the handle 21 against the tubular member 17. Preferably, the rod 18 is rotated slightly to bring the handle 21 into one of the notches 20, thus enhancing the security of the adjustment.

The distal end of each rod 18 is turned inwardly to form a foot 22 on which the leg rests when the cabin is supported on the ground, and which also serves as a means for attaching the cabin to the vehicle. Thus, in Figure 2, the tubular brackets 23, secured in any suitable manner to the front bumper brackets of the vehicle, are adapted to receive the feet 22 of the rods 18 of the forward legs 13, the feet 22 being secured within the brackets 23 by means of set screws 24.

The main frame of the cabin is, of course, rectangular in form, and comprises sills 25, preferably of wood, and angle irons 26, as best seen in Figure 6. The forward legs 13 are secured to the frame by universal joints 27 (Figure 2) so that they may be swung both longitudinally and laterally as required for attaching and detaching the cabin to and from the vehicle. A transverse diagonal brace 28 extends between each leg 13 and the frame of the cabin, being secured to the latter by a universal joint 29. The leg 13 is provided with a yoke 30 for attachment to the transverse diagonal brace 28 when the leg is in the position occupied when the cabin is mounted on the vehicle, and a second yoke 31 for attachment to the brace 28 when the leg is in the position which it occupies when the cabin is supported on the ground, as shown in broken lines in Figure 2. The brace 28 is attached to the yoke 30 or 31, as the case may be, by means of a bolt or in any other suitable manner.

The forward legs 13 are also provided with longitudinal diagonal braces 32, which are secured to the legs 13 by yokes 33. The braces 32 are attached to the frame of the cabin for pivotal and translational movement relative thereto in order that the legs 13 may be swung forwardly and laterally. The mode of attachment of the braces 32 to the frame is best illustrated in Figure 9, from which it will be seen that the brace 32 is pivotally secured to a bracket 34 which is in turn slidably attached to the frame by means of bolts 35, which latter are slidable in a slot 36 formed in the angle iron 26. The adjacent edge of the sill 25 is of course recessed to receive the heads of the bolts 35.

The rear legs 14 (Figure 1) are pivoted to the frame as at 37 for lateral swinging movement only, and are strengthened by longitudinal diagonal braces 38 which are likewise pivoted to the frame. The rear legs 14 are also provided with transverse diagonal braces pivoted to the frame and adjustably secured to the legs 14 in the manner illustrated in connection with the forward transverse braces 28 of Figure 2.

The manner of detaching and setting up the cabin will be easily understood from the foregoing. The transporting vehicle is driven to the spot on which it is desired to set up the cabin, the legs are then detached from the vehicle, one at a time, swung laterally, lengthened by extending the rod 18 to a suitable distance, and engaged with the ground. Thus, for example, referring to Figure 1, the forward leg 13 is disengaged from the bracket 15, is swung laterally and rearwardly to the position shown in dotted lines, adjusted to a suitable length, and engaged with the ground. The necessary adjustment of the brace 32 relative to the frame is accomplished by loosening the nuts on the bolts 35, sliding the bracket 34 rearwardly, and tightening the nuts on the bolts 35.

The other forward leg 13 may be similarly detached from the vehicle and engaged with the ground (see Figure 2) after which the rear legs 14 are detached from the brackets 16, one at a time, swung laterally, lengthened, and engaged with the ground. It will of course be obvious that in swinging the legs 13 and 14 laterally, it is necessary to disconnect them from the transverse braces 28 and after they have been placed in position on the ground, to reconnect them to the braces 28 by means of the yokes 31. The vehicle can then be driven out from under the cabin.

The cabin is provided with two end walls 39 and 40 and two side walls 41 and 42. The respective end walls 39 and 40 are hinged to the adjacent sills 25 in a conventional manner (Figure 4), so that they may be swung upwardly in either direction i. e., inwardly or outwardly. The height of the several walls is such that, when in folded position, the lower edges of the end walls 39 and 40 come into substantial abutment, thus forming a bottom closure for the roof structure and the other parts stored therein. The end walls may be retained in folded position by any suitable means such as spring latches (not shown). The side wall 42 is hinged to the adjacent side sill 25 as illustrated in Figure 6, the hinge 43 being secured to the sill 25 at such a height that the wall 42, when moved to horizontal position, will lie above the end walls 39 and 40. The width of the cabin must bear such a proportion to the height of the several walls that the side wall 42 may be folded up into the roof, where it is retained by means of a hook 44, or other suitable means.

The side wall 42, in folded position, rests above the side wall 41, and both of them lie above the folded end walls (Figures 4 and 6). In order to be hinged at suitable points for this purpose, and yet to be of such a height as to be received within the roof, a special hinging arrangement is required for the walls 41 and 42. This arrangement is illustrated in Figures 6, 7 and 8, from which it will be seen that the walls 41 and 42 have a sliding engagement with the movable arms 45 of the hinges 43 and 46. Thus, the upper frame member of the wall 41 is provided with two opposed brackets 47 having raised and inwardly projecting lugs 48 adapted to slidably engage the respective edges of the movable arm 45 of the hinge. The lower end of the latter is turned inwardly to form a shoulder 49 which serves to support the wall 41 when in lowered position. In order to assist in raising the wall 41 vertically before swinging it up into the roof, a coil spring 50 is connected between each hinge member 45 and a point near the bottom of the wall 41. When in folded position the wall 41 may be retained in place by means of a hook 51 (Figure 6). The wall 42 is supported in a similar manner, each wall having two or more hinges 46 and springs 50.

In folding the cabin, it will be obvious that the wall 42 is first lifted vertically, the brackets 47 sliding on the swinging arms 45 of the hinges 46, then swung upwardly into the position illustrated in Figure 6. The wall 41 is then lifted vertically and swung upwardly beneath the wall 42 after which the two end walls 39 and 40 are swung upwardly and latched in place.

In Figures 3 and 4 is illustrated a novel and convenient arrangement of beds or bunks, which may also be folded up into the roof, above the several walls. Thus, a pair of curved supporting members 52 and 53 are hinged to the adjacent side sill 25 as at 54. The member 52 serves to support one end of the upper bed frame 55, which is pivoted to the lower end of the member 52. Similarly, the member 53 supports one end of the lower bed frame 56, which is pivoted to the lower end of the member 53. The opposite end of each bed frame is supported on the wall 41 by a hook 57, 58, respectively. The outer edge of the lower bed 56 is supported by a folding leg 59 at one end and a chain 60 at the other end, while the outer edge of the upper bed 55 is supported, at the end adjacent the supporting member 52, by a detachable brace 61 extending upwardly from the lower bed 56. The outer edge of the bed 55, at its opposite end, may be supported by means of a chain 62 secured to the wall 41. It is obvious that other arrangements may be employed for supporting the beds 55 and 56, the essential inventive feature of which is the manner in which they are supported by the members 52 and 53 so that they may be folded up into the roof of the cabin, above the side and end walls.

Figure 5 illustrates the manner in which the end wall 40 may be swung outwardly to form an auxiliary roof portion. When the wall 40 is in this position, it may be supported by detachable legs 63, and the space beneath the wall 40 is preferably enclosed by a canvas enclosure 64, secured to the edges of the wall 40 and the adjacent edges of the side walls, by means of snap fasteners.

When employed in the preferred manner, the legs of the cabin are adjusted to such a length that the several walls do not extend to the ground, but terminate several inches above the ground level. A canvas floor 65 (Figure 3) is then attached to the lower edges of the four walls by snap fasteners. The several walls are secured together, at their edges, by means of hooks as at 67 (Figure 7) or other suitable devices. One or more walls may be provided with doors and/or windows as desired, a door 66 (Figure 4) being shown in the wall 41.

It is obvious that by reason of the universal connections between the legs 13 and the cabin frame, the cabin may be attached to vehicles of different lengths, the rods 18 being extended to the required distance for that purpose. The above-described structure may be carried on any ordinary passenger vehicle, with only a slight increase in fuel consumption and without harm to the vehicle or its power plant. It is economical to build, and possesses the advantage, over a trailer, that it does not detract from the maneuverability of the car, does not require the use of extra tires, etc., and imposes much less additional load on the car.

Having thus described the invention, what is claimed as new and desired to be secured by Letters Patent is:

1. A portable structure comprising a horizontally disposed rectangular frame, a roof supported on said frame, a leg secured adjacent each corner of said frame and adapted to support said frame, each said leg comprising a pair of telescoping members and means for securing said members in a fixed relation, and a plurality of wall sections pivotally hung from said frame and adapted to be swung upwardly into horizontal position adjacent said roof.

2. A portable structure comprising a horizontally disposed rectangular frame, a roof supported on said frame, a leg secured adjacent each corner of said frame for angular movement relative thereto and adapted to support said frame, each said leg comprising a pair of telescoping members and means for securing said members in a fixed relation, and a plurality of wall sections pivotally hung from said frame and adapted to be swung upwardly into horizontal position adjacent said roof.

3. A portable structure as defined in claim 2, said legs at one end of said frame being pivoted to said frame and said legs at the opposite end of said frame having universal connection therewith.

4. A portable structure as defined in claim 1, said legs having means provided at their lower ends for attachment to a vehicle.

5. A portable structure comprising a rectangular frame, a roof supported on said frame, a leg secured adjacent each corner of said frame for angular movement relative thereto, a diagonal brace connected between each said leg and said frame, said diagonal braces being pivoted to said frame, each said leg comprising a pair of telescoping members and means for securing said members in a fixed relation, and a plurality of wall sections pivotally secured to said frame.

6. A portable structure as defined in claim 5, said legs at one end of said frame having universal connection therewith and said diagonal braces associated with said last mentioned legs being connected to said frame for angular and translational movement relative thereto.

7. A portable structure comprising a horizontally disposed rectangular frame, a roof supported on said frame, a leg secured adjacent each corner of said frame and adapted to support said frame, each said leg comprising a pair of telescoping members and means for securing said members in a fixed relation, and a plurality of wall sections pivotally hung from said frame and adapted to swing into horizontal positions adjacent said roof, two opposed wall sections being of such dimensions that their bottom edges substantially abut when said wall sections are in horizontal position, whereby said last-mentioned wall sections form a closure for said structure when in folded condition.

8. A portable structure comprising a horizontally disposed rectangular frame, a roof supported on said frame, a leg secured adjacent each corner of said frame and adapted to support said frame, each said leg comprising a pair of telescoping members and means for securing said members in a fixed relation, a collapsible bed structure pivoted to said frame and adapted to fold into a position adjacent said roof, and a plurality of wall sections pivotally hung from said frame and adapted to be swung upwardly into horizontal position adjacent said roof.

9. A portable structure comprising a horizontally disposed rectangular frame, a roof supported on said frame, a leg secured adjacent each corner of said frame and adapted to support said frame, each said leg comprising a pair of telescoping members and means for securing said members in a fixed relation, and a plurality of wall sections pivotally hung from said frame and adapted to swing into horizontal positions adjacent said roof, two opposed wall sections being of such dimensions that their bottom edges substantially abut when said wall sections are in horizontal position, whereby said last-mentioned wall sections form a closure for said structure when in folded condition, and one of said wall sections being arranged to swing outwardly to form an auxiliary roof.

10. A portable structure comprising a rectangular frame, a roof supported on said frame, a leg secured adjacent each corner of said frame for angular movement relative thereto, a diagonal brace connected between each said leg and said frame for angular movement with said leg, and a second diagonal brace extending between each said leg and said frame, each said second brace being pivoted to said frame and detachably secured to said leg, each said leg having a plurality of attaching means for selective engagement with said second brace, whereby said leg may be secured at different degrees of angularity relative to the plane of said frame.

11. A portable structure comprising a rectangular frame, a roof supported on said frame, a leg secured adjacent each corner of said frame for angular movement relative thereto, a diagonal brace connected between each said leg and said frame for angular movement with said leg, and a second diagonal brace extending between each said leg and said frame, each said second brace being pivoted to said frame and detachably secured to said leg, each said leg having a plurality of attaching means for selective engagement with said second brace, whereby said leg may be secured at different degrees of angularity relative to the plane of said frame, each said leg comprising a pair of telescoping members and means for securing said members in a fixed relation.

12. A portable structure comprising a rectangular frame, a roof supported on said frame, a leg secured adjacent each corner of said frame for angular movement relative thereto, a diagonal brace connected between each said leg and said frame for angular movement with said leg, a second diagonal brace extending between each said leg and said frame, each said second brace being pivoted to said frame and detachably secured to said leg, each said leg having a plurality of attaching means for selective engagement with said second brace, whereby said leg may be secured at different degrees of angularity relative to the plane of said frame, and a plurality of wall sections pivotally secured to said frame.

13. A portable structure comprising a rectangular frame, a roof supported on said frame, a leg secured adjacent each corner of said frame, each said leg comprising a pair of telescoping members and means for securing said members in a fixed relation, and a plurality of wall sections secured to said frame, one of said sections being secured thereto for swinging and vertical translational movements relative to said frame.

ALBERT B. COLE.